Figure 1:
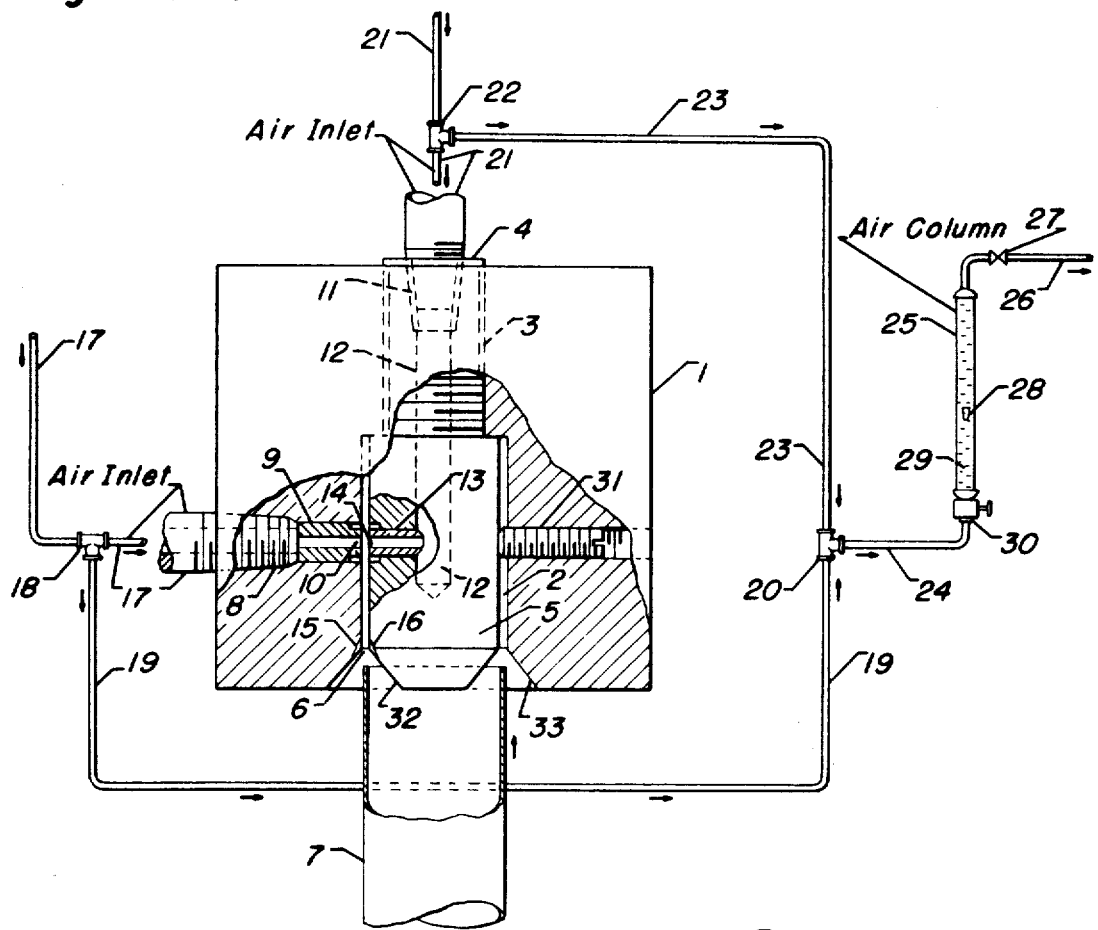

United States Patent
McLellan et al.

[15] 3,681,974
[45] Aug. 8, 1972

[54] AIR GAUGE SYSTEM FOR TUBING WALLS

[72] Inventors: Donald J. McLellan, Exeter, Ontario; Roger B. Stotts, London, Ontario, both of Canada

[73] Assignee: Universal Oil Products Company, Des Plaines, Ill.

[22] Filed: Nov. 9, 1970

[21] Appl. No.: 87,694

[52] U.S. Cl. ................................. 73/37.5, 73/37.8
[51] Int. Cl. ........................................... G01b 13/06
[58] Field of Search .................... 73/37.5, 37.8, 37.9; 33/DIG. 2

[56] References Cited

UNITED STATES PATENTS

| | | | |
|---|---|---|---|
| 2,431,014 | 11/1947 | Aller | 73/37.8 |
| 2,457,401 | 12/1948 | Rupley | 73/37.9 |

Primary Examiner—Louis R. Prince
Assistant Examiner—William A. Henry, II
Attorney—James R. Hoatson, Jr. and Philip T. Liggett

[57] ABSTRACT

An air gauge device for tubing is provided by having nozzles built into a special housing with a circular slot means. The slot for a tubing end is formed by a specially fabricated cylinder member being inserted concentrically within a sized hole in the housing. One nozzle discharges from the housing wall to one side of the slot while the opposing nozzle discharges from the internal cylinder side of the slot whereby air pressure will impinge upon each side of the wall of tubing inserted into the slot means. The connection of a calibrated pressure gauge or flow meter across the pressure supply lines to the internal opposing nozzles provides variation readings in wall thickness down to the order of 0.00025 inch.

7 Claims, 2 Drawing Figures

PATENTED AUG 8 1972

3,681,974

INVENTORS:
Donald J. McLellan
Roger B. Stotts

BY: James R. Hoatson Jr.
Philip T. Liggett
ATTORNEYS

AIR GAUGE SYSTEM FOR TUBING WALLS

The present invention relates to an air gauge device particularly adapted to measure variations in thickness for tubing walls. More specifically, the invention provides an apparatus suitable for the insertion of the end of a length of tubing into circular slot means which is provided with internally constructed opposing nozzle means. The special unit may be part of a generally conventional air gauging system.

Air gauging systems are not new and have been rather widely used to note variations in material thicknesses, to measure differences in distance between two members, or to note hole diameter variations, etc.; however, none of the known devices have been especially adapted to measure tubing wall thickness or, more particularly, variations in thickness. In general, all air gauges operate on a similar principal, in that a regulated quantity of air from a nozzle, or nozzles, is directed against a work piece and as the clearance with respect to the work piece varies, then the escaping air flow varies and so does a pressure level upstream from the nozzle. This pressure level, or an air flow rate, can be sensed or observed and used as a means for comparing clearance, a material thickness, or a dimensional variation. Actually, where thickness variations are desired, there can be two spaced apart and opposing air nozzles utilized so that an object or given piece of material can be inserted between the two. The centering of the object between the two nozzles is not required since air pressures will compensate as position varies between the two outlets. A flow meter or single column gauge that has a tee connection to tubing or passageways which, in turn, connects to the two air supply lines to the nozzles will provide an accurate means for noting variations in thickness for the material, or an object, placed between two nozzles.

For the present invention, it may be considered a principal object thereof to provide an apparatus particularly adapted to have opposing air nozzle means positioned each side of a circular slotted opening so that thickness variations in tubular materials may be observed.

It may also be considered an object of the invention to provide an air gauge device which has a removable cylinder member holding one of the air nozzle means such that modifications can be made in the device to accommodate thin wall or thick wall tubing of a particular outside diameter.

A still further object of the invention is to provide an air gauging system for tubing that is of simple construction and suitable for noting thickness variations of less than one-one-thousandth of an inch.

Broadly, the present invention provides an apparatus system, for measuring variations in thickness of tubing, which comprises in combination, a housing with a circular slot means therein from one end thereof for accommodating the non-touching insertion of tubing to be measured for thickness variations, said slot means formed by the positioning of a removable cylinder member in a circular hole in said housing which is of predetermined diameter larger than said cylinder member, a fluid outlet port provided in and through said housing to discharge in said slot means, a fluid outlet port from said cylinder member directly opposite first said outlet port and of equal size as the latter, fluid supply means to each of said opposing ports, a pressure tap means branching from each of said fluid supply means, with each of the pressure tap means being joined and a single conduit means from the juncture thereof connective to a gauging means providing a reading correlatable to the thickness of material inserted in said circular slot means.

Generally, the gauging system will use air and a conventional air column can be used as the gauging means for the system; however, nitrogen or other inert gaseous medium could be used in connection with certain installation where there might be danger in the utilization of air.

It may also be pointed out that pressure gauge readings can be utilized as well as fluid flow rate readings inasmuch as a pressure reading will be correlatable to and vary responsive to the combination of back pressure sensed from each of the air nozzles that are in turn providing for fluid flow to each side of the tubing wall. As hereinbefore noted, pressure readings are of particular advantage where there will be automatic sensing means to note pressure levels from a slip stream connective with each of the air gauging nozzles. On the other hand, with regard to the visual observation of thickness variations of tubing walls, there may be the utilization of an air column as a desirable means for noting variations in flow rate and, in turn, variations in material thickness.

With respect to the housing design and the internal cylinder member which provides for a resulting slot means to accommodate the insertion of a tubing end, there is preferably a removable cylinder member, also adjustable with respect to horizontal and longitudinal movement. Such a design will permit accurate adjustment of the cylinder member with respect to the housing in order to obtain direct opposing positioning for each of the opposing air nozzles that will be discharging against the opposing faces of the tube end being inserted into the device. A preferred design and construction also makes use of a port construction whereby there is an indention or cut-out zone around the periphery of the exterior end of each port means to in turn provide a nozzle type of construction for respectively the air outlet from the housing and the air outlet from the cylinder member.

Reference to the accompanying drawing and the following description thereof will serve to illustrate one embodiment of the improved construction and arrangement as well as set forth additional operational features which may be obtained from the use of the overall system.

FIG. 1 of the drawing is a diagrammatic elevational view, partially in section, showing the assembly of a removable cylinder member within the housing section and the provision of opposing nozzle means for each side of the resulting circular slot means.

Figure 2:
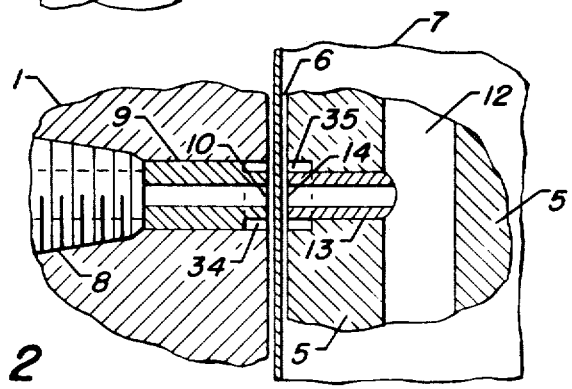

FIG. 2 is a partial sectional view, somewhat enlarged, indicating a particular form of nozzle construction for the device.

Referring now particularly to FIG. 1, there is indicated a housing member 1 which has a predetermined sized circular opening 2 through an axial portion thereof. The remaining axial extension of opening 2 is of slightly lesser diameter and provided with an internally threaded section 3 which in turn is adapted to receive an externally threaded portion encompassing an upper shank portion 4 of cylinder member 5. The non-threaded lower portion of the latter is of a predetermined diameter somewhat smaller than the opening 2 in housing 1 such that a predetermined width slot means 6 will exist between the external face of cylinder section 5 and the internal face of the hole or opening 2 in housing 1. The circular slot 6 will have a width generally correlated with the thickness of the types of tubing or piping, indicated as 7 which will be inserted for test purposes and, more particularly, to determine variations in thickness from desired standards. In other words, where thick wall tubing 7 is being tested in the device, there will be a relatively thicker annulus than for thin wall tubing. For example, but not by way of limitation, the slot means 6 which may be of the order of about one-sixteenth inch for thin wall tubing and one-eighth inch or more in width for thick wall tubing or piping.

It will be noted that the housing 1 is provided with one air inlet means from the internally threaded opening 8 and from the continuing drilled opening adapted to accommodate the inserted cylinder means 9 in turn terminating in a fluid outlet port or nozzle 10. The axially positioned cylinder member 5 with the threaded shank portion 4 is also provided with an internally threaded opening 11, adapted for connection to a pipe or tubing section 21, and an axially drilled hole 12 which carries down through a major portion of cylinder section 5 as an axial passageway. From a mid-portion of the latter, there is a radially positioned drilled hole for a tube member 13 which, in turn, serves as a nozzle outlet portion 14. The nozzle 14 is of the same size or dimension as the nozzle extremity or port means 10 within the housing 1 whereby there can be opposing equivalently sized nozzles to in turn provide for the release of air streams to each side of the tubing 7 when it is inserted into the slot means 6. For purposes of accurate assembly, the threading means 3 in housing 1 and on the matching external periphery of shank portion 4 for the center cylinder member 5 shall be relatively "fine," whereby there can be close longitudinal adjustment with respect to nozzle members 9 and 13 and a resulting axial alignment of nozzle portions 10 and 14. At the same time, it may be desirable to provide a notch means 15 on a lower wall portion of opening 2 in housing 1 as well as notch means 16 on a lower external part of cylinder member 5 whereby the alignment of the notch means 15 and 16 will in turn assure the axial alignment of nozzle means 10 and 14.

In FIG. 1 of the drawing, there is also indicated diagrammatically air inlet means to the housing 1 from piping or tubing means 17 having a Tee 18 such that a line 19 can in turn connect to a Tee member 20. Similarly, with respect to the shank portion 4 of cylinder member 5, there is piping means 21 having a Tee 22 in turn connecting with tubing 23 that joins with the opposite end of Tee 20. From Tee 20, there is tubing 24 shown connective with a suitable gauging member, such as the air column 25. The latter can be of a standard commercial construction arranged to have air flow therethrough that can be discharged by way of outlet means 26 with control valve means 27. The air column 25 will, in addition, have internal float means 28 and a scale means 29 such that there can be a visual observation of variations in float level which, in turn, will provide an indication of air flow rate through the column.

In operation, the air pressure to each of the air inlet tubings 17 and 21 will be regulated so as to provide a uniform pressure and flow rate such that the back pressure and flow rate variations carrying back to the nozzle means 10 and 14 and to the respective passageways will in turn vary the flow rates and pressures within lines 19 and 23 carrying to Tee member 20 whereby the averaged pressure and/or flow rage carrying through tube means 24 to air column 25 will, in turn, vary float member 28 with respect to height along scale means 29. It is to be noted that with a uniform thickness for tubing 7 between air outlet ports 10 and 14, and within slot means 6, will not vary pressure or flow rate at the air column 25 inasmuch as there is an averaging pressure between the two nozzles to each face of the tubing 7. Also, the actual centering of the tubing within the hole or slot means 6 is not required inasmuch as the two nozzles compensate for each other. However, the float 28 will change position where there is a variation in thickness of tubing regardless of centering in the slot. Preferably, in the utilization of the apparatus, the tubing 7 will be rotated within the slot means 6 and as long as there are no variations in wall thickness, there will be no changes in the float readings in air column 25. However, where there is greater thickness for a portion of the tubing 7, there will be a greater back pressure through the nozzle means to the respective air inlet means and an increased air flow rate indicated at air column 25. Conversely, where there is a thinner than normal portion of tube wall 7, then there will be a greater flow rate through the nozzle means of the device and a corresponding decrease in flow rate indicated at air column 25. With respect to the air column itself, the scale will be calibrated to correspond with variations in thickness for a particular tube wall thickness to be utilized in the device, with the calibration being such as to establish upper and lower float positioning by virtue of a valve 27 adjustment at the top of the air column as well as by regulator means 30 at the lower end of the column. Operational experience has shown that with small diameter tubings of the order of five-eighths inch O.D. there can be variations in wall thickness of the order down to approximately one-fourth of 0.001 of an inch.

With respect to particular construction details, it will be noted in FIG. 1 of the drawing that a set screw means 31 may be provided through the housing means 1 so as to permit the screw to contact the exterior face of cylinder section 5 and hold it at a desired location after there has been proper axial alignment of the two opposing nozzle means 10 and 14. In addition, there will be noted that the lower end portion of cylinder section 5 has been beveled or chamfered at 32 while the external periphery of the opening or hole means 2 has been beveled at 33. Thus, there is provided an easy insertion for the various tubular members 7 into the narrow slot means 6 for each thickness variation test operation.

With reference to FIG. 2 of the drawing, there has been an enlarged sectional view shown for the tube members 9 and 13 and the provision of a recessed area around each outlet port section of each nozzle means. In other words, it will be noted that member 9 has been inserted by press fitting into a drilled hole portion of housing 1 and that a small diameter end portion 10 is provided such that there is a resulting recess or opening around the latter at 34. With respect to tube member 13 in cylinder section 5, there can also be the press fit of member 13 into a radially drilled hole connective with the axial hole or opening 12 whereby air flow from the latter can pass radially outwardly in the cylinder member out the slot member 6. However, in connection with the outlet port zone around nozzle portion 14, there is provided an enlarged opening 35 whereby there is depression or recessed area around the outlet port portion of nozzle 14. As a result, the two opposing nozzles 10 and 14 will have some recessed spaces therearound to permit uniform air flow outwardly in each case into the slot area 6. It is to be further noted that the inside diameter of each of the tube means 9 and 13 shall be equivalent whereby there will be resulting equivalent "nozzle action" from each side of the slot 6 and against each face of the tubing which will be inserted into the slot means.

As hereinbefore noted, the removable construction for the cylinder member 5, with threaded shank section 4, permits the removability and interchangeability of cylinder sections in the tube testing device. In other words, where thick wall tubings or pipes are to be inserted in the device for measuring variations in wall thickness, then a small diameter cylinder section 5 can be utilized and provide a greater slot width for the annular slot means 6 without any changes in the housing or block portion 1. Variations in methods of alignment or positioning the cylinder member with respect to the housing member so as to obtain accurate axial alignment with the two opposing nozzles may be provided within the scope of the present invention. Also, variations in actual design and placement of nozzle members themselves will be obvious to those skilled in the art and should be considered within the general broad scope of the present invention which provides for the adjustability and removability for a central cylinder section within a device adapted to check or gauge tube wall measurements.

Still further, it is not intended to limit the present system to the use of a single air column only, inasmuch as other types of air columns, flow meters, pressure gauge means, etc., may well be used after proper calibration to effect the desired variations in flow measurement and indications of wall thickness differences. In connection with automatic read-out systems, it is generally preferable to utilize pressure gauging where the instrumentation is sensitive to air pressure rather than to flow rates.

We claim as our invention:

1. An apparatus system for measuring variations in thickness of tubing, which comprises in combination, a housing with a circular slot means therein from one end thereof for accommodating the non-touching insertion of tubing to be measured for thickness variations, said slot means formed by the positioning of a removable cylinder member in a circular hole in said housing which is of predetermined diameter larger than said cylinder member, a fluid outlet port provided in and through said housing to discharge in said slot means, a fluid outlet port from said cylinder member directly opposite first said outlet port and of equal size as the latter, means in cooperative association with said housing and said cylinder member enabling radial alignment of said respective outlet ports, fluid supply means to each of said opposing ports, a pressure tap means branching from each of said fluid supply means, with each of the pressure tap means being joined and a single conduit means from the juncture thereof connective to a gauging means providing a reading correlatable to the thickness of material inserted in said circular slot means.

2. The apparatus system of claim 1 further characterized in that said cylinder member has a threaded shank portion and said housing has a threaded section adapted to receive the latter, whereby an adjustable threaded engagement is provided between said housing and said cylinder member.

3. The apparatus system of claim 1 further characterized in that said fluid supply means for said cylinder member includes a fluid passageway axially through a portion of the cylinder member from the end opposite said slot means and a radial passageway from the latter to terminate at the exterior face of said cylinder member as said fluid outlet port therefrom.

4. The apparatus system of claim 1 further characterized in that both of said fluid outlet ports have recessed areas of equal size around their outer extremities and the inside and outside diameters are equal size, whereby to provide equivalent nozzle effects for the discharge of an air stream from each port.

5. The apparatus system of claim 4 still further characterized in that each of the fluid outlet port means through said housing and through a radial portion of said cylinder member are provided by a tubular form nozzle member provided within a drilled passageway for respectively the housing and said cylinder member.

6. The apparatus system of claim 1 further characterized in that said gauging means connective with said single conduit means connects with a calibrated air column having a float member therein that is adjusted to float along a vertical scale responsive to variations in wall thickness for the tubing in the slot means which, in turn, will provide variations in flow rate to said air column.

7. An apparatus system for measuring variations in thickness of tubing, which comprises in combination, a housing with a circular slot means therein from one end thereof for accommodating the non-touching insertion of tubing to be measured for thickness variations, said slot means formed by the positioning of a removable cylinder member in a circular hole in said housing which is of predetermined diameter larger than said cylinder member, a fluid outlet port provided in and through said housing to discharge in said slot means, a fluid outlet port from said cylinder member directly opposite first said outlet port and of equal size as the latter, a positioning mark in longitudinal alignment with the center of the outlet port for said housing and a positioning mark in longitudinal alignment with the center of the fluid outlet port for said cylinder member, whereby the alignment of said positioning marks with one another will in turn effect radial alignment between said fluid outlet ports, fluid supply means to each of said opposing ports, a pressure tap means branching form each of said fluid supply means, with each of the pressure tap means being joined and a single conduit means from the juncture thereof connective to a gauging means providing a reading correlatable to the thickness of material inserted in said circular slot means.

* * * * *